No. 867,629. PATENTED OCT. 8, 1907.
N. L. WINE.
WIRE HOLDER.
APPLICATION FILED JAN. 16, 1907.
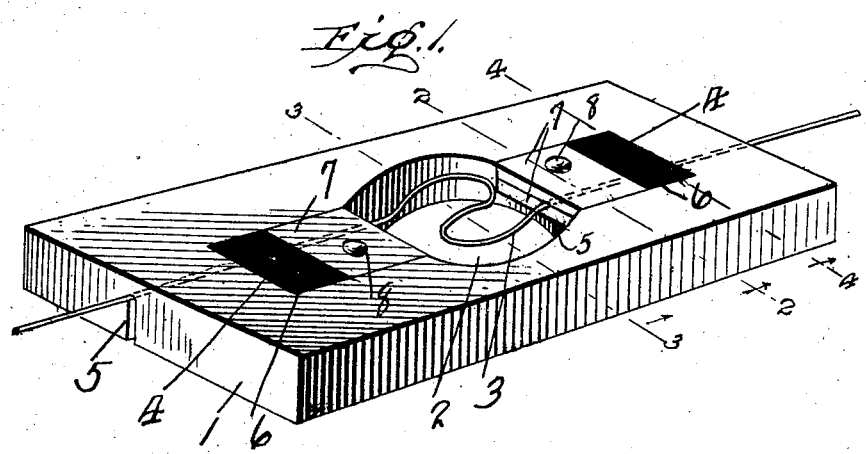
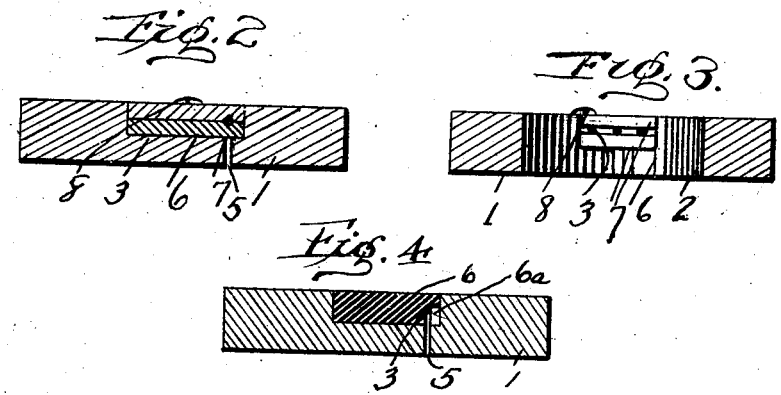

UNITED STATES PATENT OFFICE.

NOAH L. WINE, OF POLO, ILLINOIS.

WIRE-HOLDER.

No. 867,629.　　　　Specification of Letters Patent.　　　Patented Oct. 8, 1907.

Application filed January 16, 1907. Serial No. 352,624.

*To all whom it may concern:*

Be it known that I, NOAH L. WINE, a citizen of the United States, residing at Polo, in the county of Ogle and State of Illinois, have invented certain new and useful Improvements in Wire-Holders, of which the following is a specification.

This invention relates to new and useful improvements in wire holders and it has particular reference to a clamp for telephone wires.

The invention relates specifically to that class of devices which are designed to prevent or deaden the humming sound which occurs in suspended wires during the course of a breeze or wind and has for its object to provide novel sound deadening means comprising means for taking up the slack of the wire and means for absorbing the vibrations thereof.

The detailed construction will appear in the course of the following description in which reference is had to the accompanying drawings forming a part of this specification, like characters of reference designating similar parts throughout the several views, wherein, Figure 1 is a detailed perspective view of a wire clamping device constructed in accordance with the present invention. Fig. 2 is a transverse section thereof on the line 2—2 of Fig. 1. Fig. 3 is a transverse section on the line 3—3 of Fig. 1, and Fig. 4 is a similar view on the line 4—4 of Fig. 1.

The clamp embodied in the present invention comprises essentially a body portion 1, having an enlarged central opening 2 within which is received the slack of the wire 3. On each side of the opening 2 and communicating therewith are recesses 4 which in turn communicate with longitudinal grooves 5 cut into the underneath face of the body portion 1 and extending on opposite sides of the central line to the end edges of said body portion. The wire 3 passes continually through the grooves 5, the recesses 4 and the opening 2. After being tightened by suitable means, said wire is clamped in said recesses and its slack is received in said opening 2 as above intimated. Adjacent the end walls of each of the recesses 4, sections of rubber or yieldable cushioning material 6 are disposed which have recesses 6ª in the corners thereof to permit of the passage of the wire 3 therethrough. The clamping means comprises superimposed plates 7 of restricted dimensions which are clamped within the respective recesses 4 adjacent the open ends thereof, by suitable means, such as a bolt or screw 8. The plates 7 are designed to clamp the wire 3 with sufficient pressure to frictionally hold the same against displacement so that the bight of its slack will always be maintained in the opening 2.

It will be apparent that the rubber section 6 and the plates 7 may be removed at will for the purposes of renewal, or for taking up the slack of the wire and that the vibrations of the wire 3 will be absorbed by the rubber sections 6 in their cushioning function.

While the elements herein shown and described are well adapted to serve the functions set forth, it is obvious that various minor changes may be made in the proportions, shape and arrangement of the several parts without departing from the spirit and scope of the invention as defined in the appended claims.

Having fully described my invention I claim:

1. A device of the type set forth comprising a body portion having a central slack opening, wire clamping means adjacent to said opening and a section of yieldable shock absorbing material adjacent said clamping means and contacting with the wire.

2. A device of the type set forth comprising a body portion, wire clamping means carried thereby, and a section of rubber held in said body portion adjacent said clamping means and being recessed to receive a wire therethrough.

3. A device of the type set forth comprising wire clamping means and shock absorbing material adjacent thereto and contacting with the wire held by said clamping means.

In testimony whereof I affix my signature in presence of two witnesses.

NOAH L. WINE.

Witnesses:
　ROBERT M. BRAND,
　FRANK BOOTH.